UNITED STATES PATENT OFFICE.

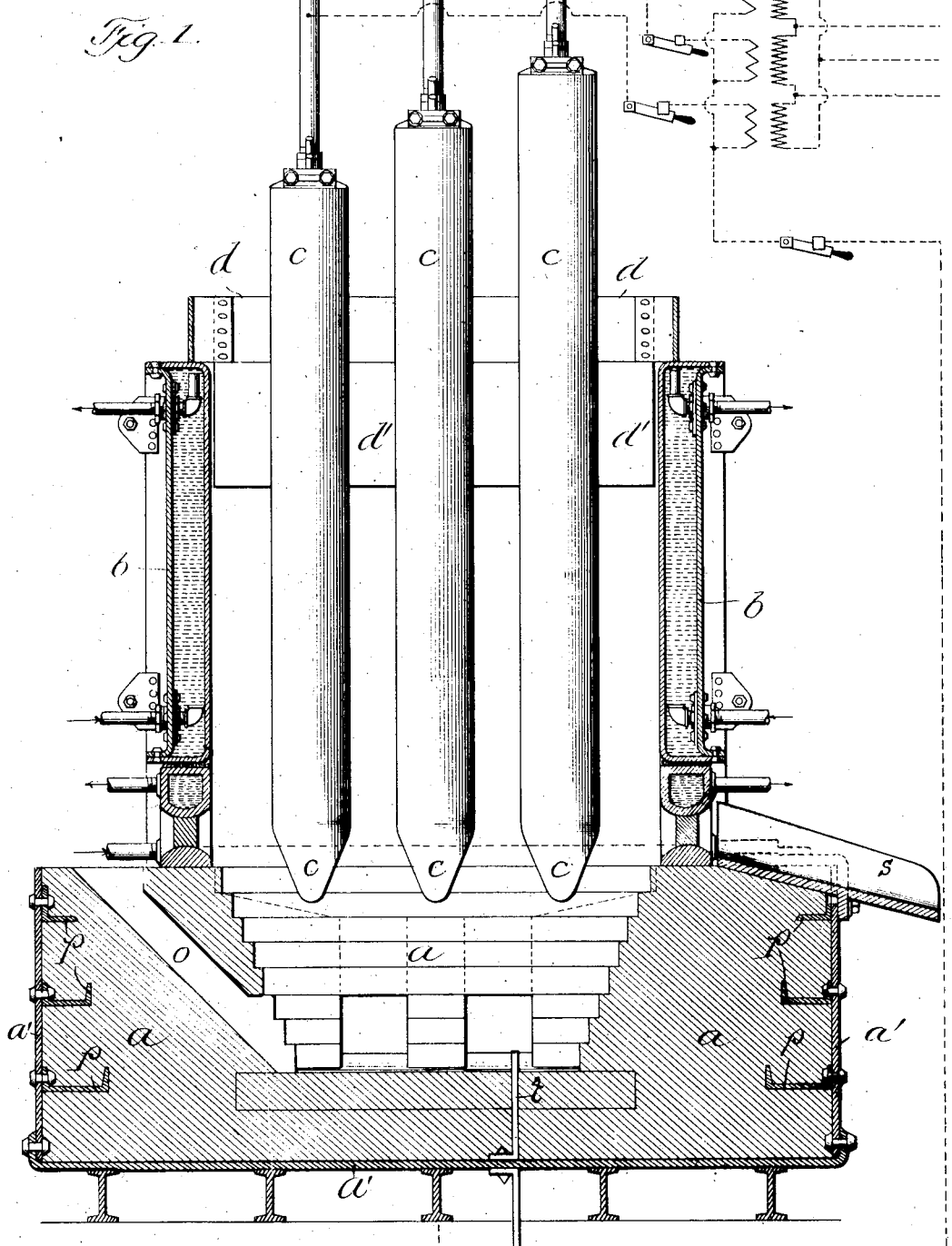

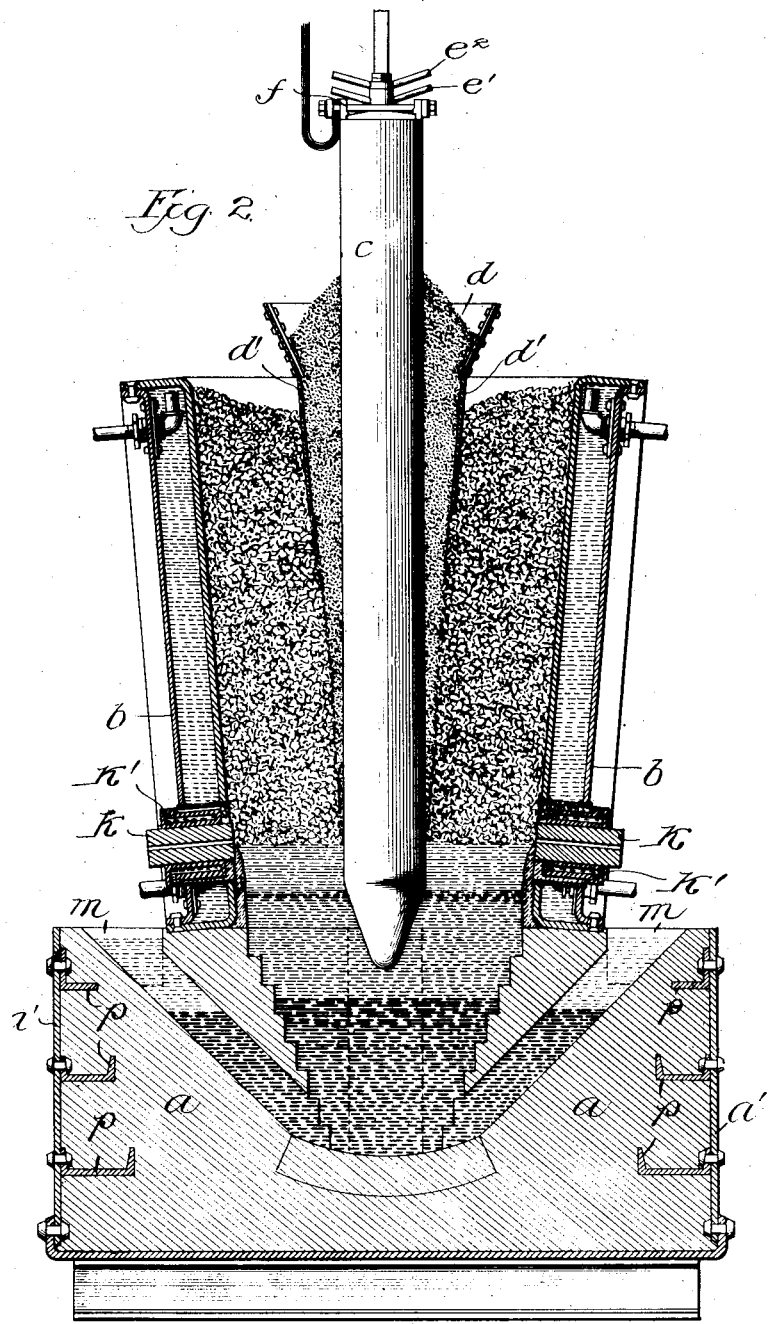

FREDERICK T. SNYDER, OF OAK PARK, ILLINOIS, ASSIGNOR TO ELECTRIC METALS COMPANY, OF CHICAGO, ILLINOIS, A CORPORATION OF WEST VIRGINIA.

ELECTRIC FURNACE.

942,110.  Specification of Letters Patent.  Patented Dec. 7, 1909.

Application filed September 25, 1906. Serial No. 336,186.

*To all whom it may concern:*

Be it known that I, FREDERICK T. SNYDER, citizen of the United States, residing at Oak Park, in the county of Cook and State of Illinois, have invented a certain new and useful Improvement in Electric Furnaces, of which the following is a full, clear, concise, and exact description.

My invention relates to an electric furnace for the smelting of ores, with especial reference to ores of metals which are volatile at reduction. For example, my furnace will be especially useful for smelting zinc ore, and in connection with such ore one object of this invention is to adapt the furnace to the direct production of spelter, instead of zinc dust.

More specific features of the invention relate to means for preventing effects of self-induction due to the iron water-jacket, to an improved construction of furnace which will be especially adapted for use in connection with a three-phase system of electrical distribution, to improved means for withdrawing the condensed volatile metal and maintaining the same in a suitably-heated condition, as well as for refining the metallic product and separately collecting the different metals; and to details of construction, looking toward strength, simplicity, durability, cheapness of construction, and ease and efficiency of operation.

I will describe the several features of this invention by reference to the furnace shown in the accompanying drawings, in which—

Figure 1 is a vertical sectional elevation of the furnace; Fig. 2 is a sectional elevation taken at right angles to Fig. 1.

Like parts are designated by similar letters of reference in both figures.

The form of furnace shown in the drawings consists of a crucible base $a$ of fire-brick masonry, which is supported in an iron caisson $a'$, and this base is surmounted by a furnace chamber, the walls whereof are made of hollow iron jackets or conduits $b$ through which a flow of water is maintained. The furnace chamber is open at the top to receive the charge and to permit the escape of uncondensed vapors. The water jackets preferably extend clear to the top of the furnace to cool the upper portion of the charge. When in operation, the lower portion of the crucible will contain molten metal (such as lead) above which there will be molten matte and slag. The furnace illustrated is adapted for use with a three-phase system of electrical distribution, three carbon electrodes $c$ being provided, which are suspended in upright positions in the furnace chamber, extending down far enough to dip into the molten conducting material contained in the crucible. A removable hopper $d$ is supported at the top of the furnace immediately surrounding the electrodes, the side guide-plates $d'$ $d'$ of said hopper being located between the electrodes and the side walls of the furnace. This hopper is adapted to receive a special element of the charge, such as powdered coke, to be fed immediately around the electrodes, the main body of the charge being fed into the furnace between the outer edges of the removable hopper and the side walls of the furnace.

An important feature of this invention is a construction of the furnace such that the volatile metallic product may be condensed as a liquid and drawn off through the side walls of the furnace. The non-metallic gaseous products of reduction are allowed to escape through the porous material of the charge and leave the furnace at the top, but the upper portion of the charge is kept sufficiently cool to condense the metallic vapors and prevent their escape. The charge is thus progressively enriched by condensed metal until the vapors condense in liquid form rather than as dust, and collect at the water-jacketed walls. I provide drains by which such condensed liquid metal may be withdrawn through said walls, these drains consisting of thick tubes K of graphite or other material which is a poor conductor of heat, passing through openings in the water-jacketed walls. The bores of these tubes are relatively quite small so that they will be completely filled by a small stream of liquid metal and the passage of any gas therethrough thus effectually prevented. These tubes also serve to condense any metallic vapor which may enter them; and I preferably surround each tube with an independent water-jacket K' to assist in keeping its temperature sufficiently low. On the other hand, the tubes are sufficiently thick so that the heat from the liquid metal passing through them will not be too quickly conducted away to the water-jacket, which would otherwise tend to freeze the metal and choke up the passage.

It will thus be seen that my invention contemplates a furnace in which the condensed volatile metal is withdrawn by a passage through a water-cooled wall which acts as a condenser, and that this passage has a lining, so to speak, of refractory or poor heat-conducting material, so that the heat from the flowing liquid metal will not be so quickly conducted away by the water jackets as to cause the metal to be congealed in the passages. If desired, however, to close up one of the outlet passages, this may be done very simply and easily by permitting a greater flow of cooling water around its individual water-jacket, which will result in freezing the metal in the passage. The passage may be opened again when desired by lessening the flow of water to permit the metal to melt out. The area of the outlet passages may thus be controlled at will. The slag immediately in the vicinity of the electrodes is molten, but toward the water-jacketed walls of the furnace, it is cooler, and is congealed on these walls to form a lining therefor. This lining is self-renewing and is kept from melting entirely away by the cooling effect of the flowing water. The lining extends up along the lower portion of the side walls as high as the level of the molten slag reaches, and the upper edge or rim of the lining serves as a drain to collect the liquid zinc which has condensed on the upper portion of the wall and run down. The tubes forming the zinc outlets open just above the slag level, to receive and drain off the zinc which is collected by the slag rim.

The liquid zinc or other metal discharged from the tubes K is collected in wells m in the base of the furnace. These wells preferably communicate with the lower portion of the crucible and extend upwardly and outwardly therefrom so as to open outside the furnace under the discharge ends of the tubes K. These wells m serve to permit the refining of the volatile metallic product therein, since any of the heavier metal such as lead, which may have been volatilized and carried out with the regular volatile metallic product, will settle out in the wells m and join the main body of the same metal which is collected in a molten state at the bottom of the crucible. Separate wells or passages o lead upward and outward from the lower portion of the crucible to a point outside the furnace walls, from which the lead or other heavy metal may be ladled out from time to time as desired.

Another feature of the invention relates to the detailed construction of the crucible base. Metal trusses or braces p (such as the angle-irons and channel irons shown) are riveted or otherwise secured to the inside of the caisson a' and extend through the body of masonry a, thus serving at the same time as braces or strengthening webs for the metal caisson and also directly sustaining and supporting the masonry itself. The iron braces embedded in the masonry also serve to prevent it from floating up when the crucible is filled with lead, which leaks through the masonry and gives rise to a strong upward pressure thereon.

A further feature of my furnace (when used with alternating current) relates to the means for preventing self-induction, due to the iron water-jackets, which of course form a practically closed magnetic circuit around the furnace. It will be observed that in the furnace shown, the current which enters through an electrode extending down through the top of the furnace, is normally taken out, not by an electrode at the bottom as customary heretofore, but by another electrode or electrodes also entering through the top. In other words, the current is taken into and out of the furnace at the same end of the closed yoke formed by the water-jacket, so that the self-induction from the water-jacket produced we will say by the effect of the current passing in one direction, is neutralized by the effect of the current flowing in the opposite direction. Otherwise, if the current merely passed in one direction through the furnace, the water-jacket surrounding it would act as the closed core of a transformer, and would give rise to considerable current lag and consequent low power factor.

It will be observed that the furnace shown is especially adapted for use in connection with a three-phase system of electrical distribution, one electrode being provided for connection to each of the three wires. A feature of the invention consists in disposing the several electrodes in a row instead of in a close group, the furnace being of narrow oblong shape so that the side walls may be close to the source of heat. There is a limit to the thickness of material through which the gaseous zinc may easily escape; and, by the construction above described, the side walls at which the zinc vapor is condensed and collected may be placed as close as desired to the electrodes while at the same time the furnace may be made of large capacity by increasing its length.

It will be apparent that as many electrodes may be provided as the capacity of the furnace requires.

A slag tap s is provided at the top of the crucible base, the slag being drawn off through a hole in the water-cooled furnace wall, this hole being ordinarily closed by a clay plug.

The operation of the furnace in smelting lead-zinc ore will be apparent. The charge fed in at the top of the furnace is gradually reduced, the lead settling at the bottom of the crucible while the zinc is volatilized, the residues being fused to form slag and matte. The non-metallic gaseous products of reduction, such as CO, escape through the porous body of material constituting the charge, and burn at the top. The charge at the top is sufficiently cool so that the zinc vapor is condensed before it can escape. The material in the furnace thus gradually becomes enriched in zinc, as it works down, so that finally the zinc is sufficiently rich to condense as a coherent liquid rather than as zinc dust, and is drained off through the tubes or passages K, condensation taking place in the entrance to said tubes as well as on the adjacent walls. Liquid metal collecting on the walls and draining down, either flows out of these tubes or passes down to the zone of greater heat and is re-vaporized and again condensed, and so finally finds its way to the outlet-tubes. The liquid metal drawn off through these tubes is collected in the wells m and refined as previously described, the heavier metal settling out and joining that in the bottom of the crucible. The metals are then ladled out of the respective wells m and o.

The consumption of the carbon electrodes is lessened by feeding powdered carbon through the supplemental hopper d immediately surrounding said electrodes, so that this powdered carbon, rather than the solid carbon of the electrodes, is consumed for the reduction of the ore, the latter being to a great extent shielded from attack.

I prefer to arrange the electrical connections of the furnace as indicated diagrammatically in Fig. 1. The transformers supplying current to the furnace have their secondary coils "star-connected", and the three electrodes are connected with the three main conductors, while the molten material in the crucible is connected to the "neutral" or junction of the three star-connected coils. A copper strip t riveted to the inside of the iron bottom of the crucible (to which the neutral conductor is connected) extends up into the crucible to make electrical connection with the molten material therein, thus forming the neutral electrode. In the ordinary operation of the furnace, little if any current flows over the neutral, but the arrangement permits any one of the electrodes to be cut off while the remaining two still receive current from two coils of the transformer, the capacity of the furnace being reduced only one-third. If the secondary of the transformer were delta-connected, with no "neutral" conductor, the cutting off of a single electrode would cut down the capacity of the furnace two-thirds.

It will be understood that certain features of invention herein set forth will be applicable to furnaces of different types from the one shown, and various modifications may be made in many respects while still making use of one or more of the essential novel principles or details of construction herein disclosed.

I claim:—

1. An electric furnace comprising a crucible base, a fluid-cooled wall surmounting said base, a tap-opening being provided near the top of the crucible for drawing off the molten product therein, and a body of heat-insulating material extending through said cooled wall above the level of said t p, and having an outlet opening therethrough.

2. An electric smelting furnace having a fluid-cooled wall, a tap opening being provided for removing the molten product, and a tube of heat-insulating material extending through said wall, above the level of said tap opening, the bore of said tube being relatively small and an additional water-jacket surrounding said tube.

3. In an electric furnace adapted to be heated by the passage of an electric current through a bath of slag, the combination of water-jacketed walls, a body of heat-insulating material extending through said walls above the level of said slag bath and having an outlet from the furnace therethrough.

4. The combination with an electric smelting furnace having a crucible base surmounted by a water-jacketed wall, said furnace being adapted to be heated by the passage of electricity through a bath of molten slag contained in said crucible base, said wall having a passage therethrough above the line of said slag bath and a lining of heat-insulating material for said passage.

5. An electric furnace having a crucible base, a water-jacket surmounting said base to form the wall of the furnace, a tap opening being provided near the top of said crucible for removing the molten product from the furnace, and a plug of carbonaceous material extending through said water-jacket above the level of said tap, said plug having a relatively small opening therethrough.

6. The combination with a smelting furnace, of a water jacket forming an interior wall adapted to condense metallic vapor in said furnace, a tap opening being provided for removing the molten product, said wall having a passage therein above the level of said tap opening and near the bottom of said water-jacket, through which the condensed metal may be carried off, the passage having a lining of material which is a poor conductor of heat; whereby the metal being carried off is prevented from congealing and choking said passage.

7. In an electric furnace, the combination with a crucible base, of a water-jacketed wall surmounting said base to form a smelting chamber, the top of said chamber being open, a bath of molten conducting material in said crucible, a carbon electrode extending down through the open top of the furnace and making electrical connection with said molten bath, and a plug of refractory material extending through the water-jacketed wall above the level of said molten bath, said plug having a restricted hole therethrough adapted to conduct liquid metal through the walls to the exterior of the furnace.

8. In an electric smelting furnace, the combination with a crucible base and a water-jacketed wall surmounting said base to form a smelting chamber, of a thick tube of material which is a poor conductor of heat, extending through said water-jacketed wall and adapted to carry out the liquid metal condensed from the volatile metallic product of smelting, the said base having a well therein, opening under the mouth of said tube outside the chamber-wall, to receive the liquid metal from said tube, said well communicating with the lower portion of the crucible inside the furnace, whereby the metal in said well is kept heated by the molten contents of said crucible.

9. The combination with a smelting furnace having a crucible base and a smelting chamber surmounting said base; of a drain arranged to carry liquid metal through the walls of the smelting chamber, the base having a well therein opening under the mouth of said drain outside the furnace, and communicating with the lower portion of the crucible, whereby the metal in said well is kept heated by the molten contents of said crucible.

10. In an electric furnace, the combination with a crucible base adapted to contain molten product, of a furnace chamber surmounting said base, said chamber having a permanent opening at the top adapted to permit the escape of gas and a tap opening for removing the molten product, the walls of said chamber being hollow at the top, means for maintaining a flow of cooling liquid in said hollow walls to cool the charge at the top and condense the volatile liquid metal to prevent its escape with the non-condensible gases, said chamber having an outlet for condensed liquid metal, through the side of the furnace above the level of said tap opening.

11. In an electric smelting furnace, the combination with a crucible base, of chamber walls surmounting said base, an opening being provided through the wall to carry off the condensed liquid metal, the base having two wells for holding the metallic products, said wells communicating at the bottom with the lower portion of said crucible and opening outside the wall of the smelting chamber, the mouth of one of said wells being in position to receive the liquid metal discharged through said opening in the chamber wall.

12. In an electric furnace, the combination with a long and narrow furnace chamber adapted to contain molten conducting material at the bottom, of electrodes in said chamber arranged in a row extending along the length of the furnace, said chamber having multiple outlets for the molten products in the side walls close to the source of heat.

13. The combination with a source of three-phase alternating currents having coils connected in "star" arrangement, of an electric furnace having a long and narrow furnace chamber and electrodes arranged substantially in a row extending lengthwise of said chamber, said electrodes dipping into a bath of molten conducting material, conductors connecting said electrodes respectively with the outer terminals of the star-connected coils, and a neutral conductor connecting said molten material with the junction of said star-connected coils.

14. In an electric furnace, the combination with a source of alternating current, of a furnace chamber having a wall consisting of a water-jacket of magnetic material which forms a substantially-closed magnetic circuit around the chamber, of two or more electrodes connected for taking the current both in and out of the furnace through the same end of the chamber forming the closed circuit, whereby the effect of self-induction by said wall is neutralized.

15. In an electric furnace, the combination with a crucible base, of an iron water-jacket surmounting said base to form a furnace chamber, and two or more electrodes supported in said furnace chamber passing through the top thereof, and adapted to be electrically united in the furnace by a fused bath of molten conducting material, said plurality of electrodes being adapted to convey the current both in and out of the furnace through the top, whereby the effect of self-induction by the water-jacket is neutralized.

In witness whereof, I hereunto subscribe my name this 6th day of September A. D., 1906.

FREDERICK T. SNYDER.

Witnesses:
D. C. TANNER,
A. H. MOORE.